T. A. EDISON.
STORAGE BATTERY.
APPLICATION FILED DEC. 7, 1905.
914,342.
Patented Mar. 2, 1909.
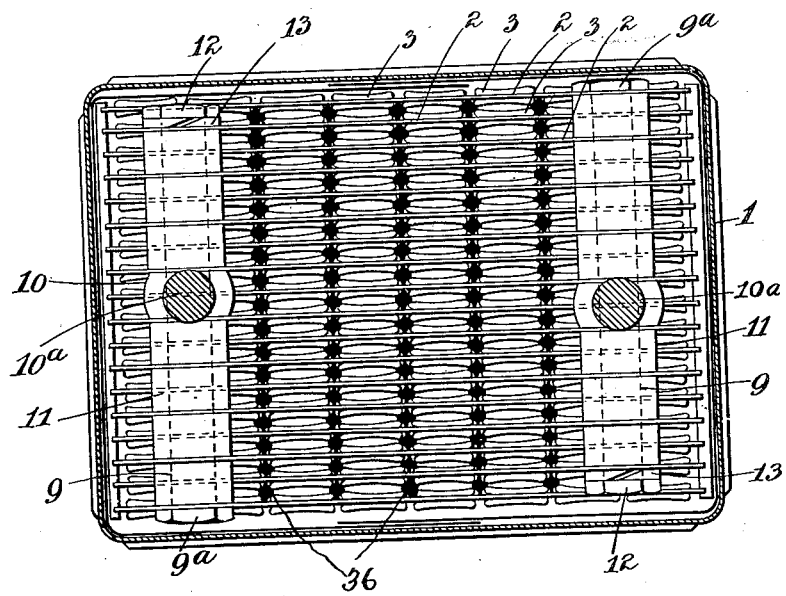
Attest:
Edgworth Greene
Delos Holden
Inventor:
Thomas A. Edison
by Frank L. Dyer, Atty.

UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF WEST ORANGE, NEW JERSEY, A CORPORATION OF NEW JERSEY.

STORAGE BATTERY.

No. 914,342.　　　　Specification of Letters Patent.　　Patented March 2, 1909.

Original application filed November 28, 1902, Serial No. 133,112. Divided and this application filed December 7, 1905. Serial No. 290,711.

*To all whom it may concern:*

Be it known that I, THOMAS ALVA EDISON, a citizen of the United States, and a resident of Llewellyn Park, Orange, in the county of Essex and State of New Jersey, have invented certain new and useful Improvements in Storage Batteries, of which the following is a description.

This application is a division of Patent No. 852,424 granted March 7, 1907.

My invention relates to improvements in storage batteries and more particularly to the means for holding the plates which carry the active materials rigidly and in such a manner that plates of opposite polarity cannot contact with each other, and plates of like polarity will be bound together so that the vibration to which the cells will be subjected in practice, as when used in automobiles and railway cars, will not loosen the holding means so as to allow the plates to vibrate; and while the present improvements have been designed especially for use in connection with storage batteries of the type invented by me wherein insoluble active materials are employed in an alkaline electrolyte, it will be understood that the invention is applicable for use with storage batteries of other types.

Reference is hereby made to the accompanying drawing which shows a storage battery cell in plan, the containing receptacle being in section.

The cam 1 is generally rectangular as shown, being formed preferably of thin sheet metal which has been carefully nickel-plated so as to prevent oxidation, particularly in an alkaline solution, although it is obvious that other metals can be employed if desired.
The grids 2 are substantially like those which I have described in prior patents and carry a plurality of pockets 3 containing the active material, said pockets being crimped in position under pressure. The grids and pockets constituting the entire plate are preferably made of carefully nickel-plated steel, the nickel-plated coating being welded to the steel in an atmosphere of hydrogen.

Plates of like polarity are connected together and are mounted on bolts 9 having heads 9ª which pass also through the eye 10 of a proper conductor 10ª for the external circuit. The plates of each set are separated by washers 11 and the plates and washers of each set are held rigidly together on the bolts 9 by nuts 12, a hardened split spring washer 13 of ordinary construction being employed on each bolt for locking the nut and preventing accidental loosening thereof.

In order to prevent plates of opposite polarity from engaging one another, separating rods or bars 36 essentially star shaped in cross-section, may be utilized, said rods being mounted in the vertical channels formed between adjacent pockets, so that each rod engages the corners of four adjacent pockets as shown, and opposite edges may engage the surfaces of the grids as shown.

Having now described my invention, what I claim as new and desire to secure by Letters Patent is as follows:

1. In a storage battery, the combination of a series of plates of one polarity, a bolt on which said plates are strung, a series of plates of the opposite polarity, a bolt on which said second named plates are strung, parallel to said first named bolt, conducting separators strung on said bolts between plates of like polarity, means for elastically clamping said plates and separators together and non-conducting separators between all the plates for insulating plates of opposite polarity from each other, substantially as set forth.

2. In a storage battery, the combination of a series of plates carrying pockets containing active material and insulating means situated between the plates and the pockets, each said means arranged to prevent contact between adjacent plates and the pockets, substantially as set forth.

3. In a storage battery, the combination of a series of plates carrying pockets containing active material and insulating means situated in the channels between adjacent pockets and adjacent plates for preventing contact between elements of opposite polarity, substantially as set forth.

4. In a storage battery, the combination of a series of plates of one polarity, a series of plates of the opposite polarity parallel thereto, the plates of one series alternating with those of the other, all of the plates carrying protuberances or pockets filled with active material, means for elastically and conductively clamping together all the plates of the same polarity, and means for insulating the plates and protuberances of unlike polarity from each other, substantially as set forth.

5. In a storage battery, the combination with two grids carrying pockets containing active materials, of vertical rods of insulating material situated between the grids, each rod engaging four adjacent pockets, substantially as set forth.

6. In a storage battery, the combination with two grids containing pockets of active material, of separators between the grids, each of which engages four adjacent pockets and whose cross-section is a figure having two axes of symmetry at right angles to each other, substantially as set forth.

7. In a storage battery, the combination with two grids containing pockets of active material, of separators between the grids, each of which engages four adjacent pockets and whose cross-section is a star, substantially as set forth.

This specification signed and witnessed this 6th day of December, 1905.

THOS. A. EDISON.

Witnesses:
FRANK L. DYER,
ANNA R. KLEHM.